April 18, 1939. H. R. CRAGO 2,155,255
TEMPERATURE CONTROL SYSTEM
Filed Sept. 21, 1935
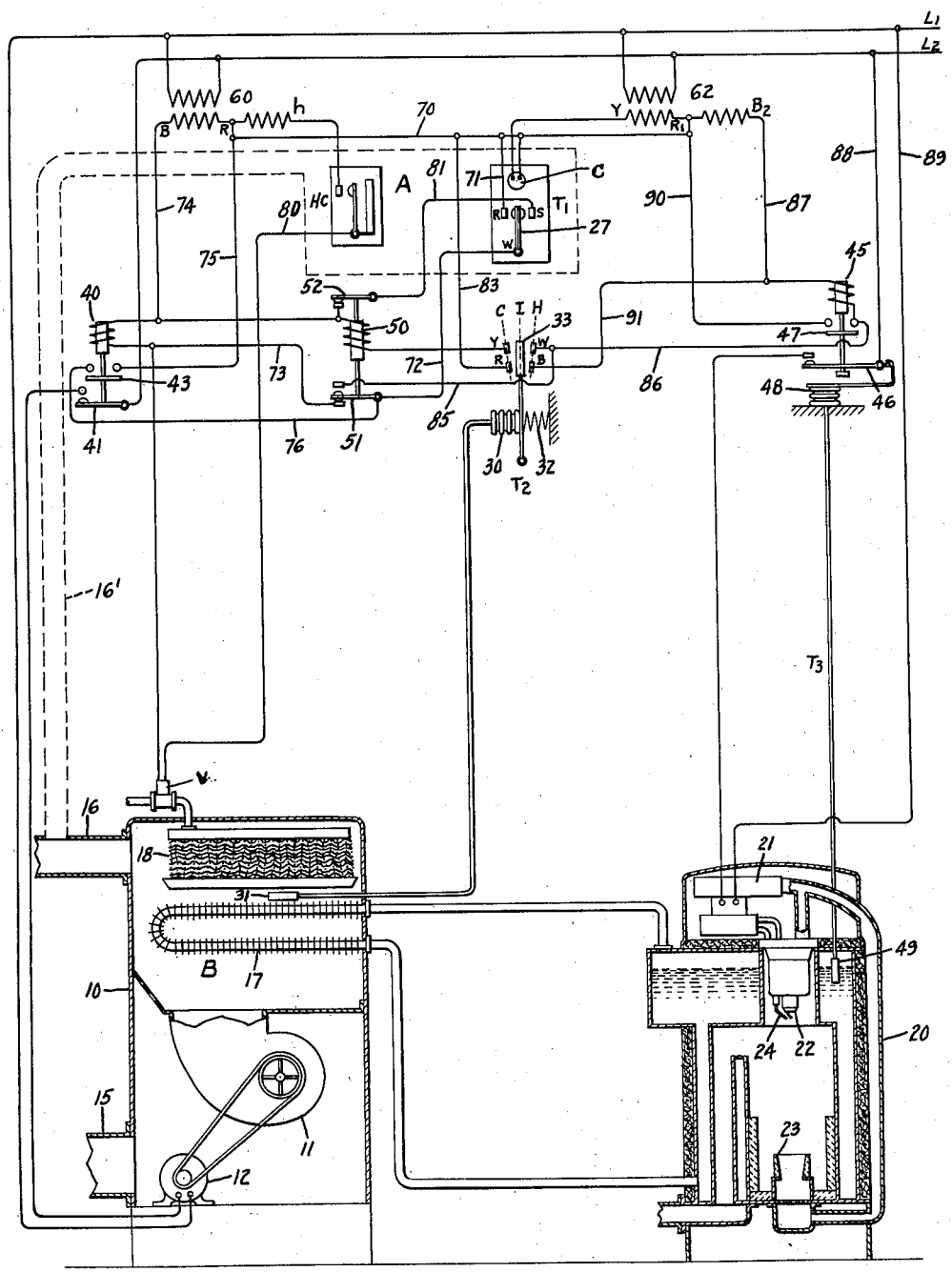
Inventor:
Harry R. Crago,
by Harry E. Dunham
His Attorney.

Patented Apr. 18, 1939

2,155,255

UNITED STATES PATENT OFFICE 2,155,255

TEMPERATURE CONTROL SYSTEM

Harry R. Crago, Caldwell, N. J., assignor to General Electric Company, a corporation of New York Application September 21, 1935, Serial No. 41,577

11 Claims. (Cl. 236—11)

The invention relates to temperature control systems, particularly systems employed in air conditioning or other temperature regulating service in which a plurality of inter-related temperatures are selectively controlled in accordance with predetermined conditions.

One of the principal objects is to provide an improved temperature control system wherein joint or separate operation of a plurality of temperature regulating means may be obtained under the selective control of a plurality of thermostats responsive to variations in different predetermined temperature conditions.

Although the broad principle of the invention is of general application, a special object is to provide an improved control for an air conditioning system having a room thermostat and a three position selective temperature thermostat for jointly and separately controlling the operation of an electrically controlled air circulating and conditioning apparatus and an electrically controlled automatically fired boiler furnace provided with a steam coil for heating the circulated air. In such a system the air circulating and conditioning apparatus is operated to transfer the heated air to regulate the temperature of a room or other space to a desired value and the furnace is operated to regulate the temperature of the circulated air. To avoid discomfort due to circulation of air, it is desirable to start operation of the air circulating and conditioning apparatus only when the condition of the furnace is such as to maintain the air temperature above a comfortable minimum value. In case the condition of the furnace is not such as to maintain the air above the minimum desired temperature value, it is desirable to start operation of the furnace only upon a call for heated air from the room thermostat. Furthermore, it is desirable to insure continued operation of the furnace when once started until it is in condition to insure a continued supply of heated air over a substantial interval of time and thus improve the efficiency of combustion by avoiding repeated starting and stopping of the automatic burner apparatus as may occur in the operation of the air circulating and conditioning apparatus.

The present invention provides improved means for selectively transferring control of both the starting and the stopping of operation of the air circulating and conditioning apparatus and of the furnace between the thermostat responsive to the room temperature and the three position selective thermostat responsive to a temperature condition dependent upon the furnace in accordance with predetermined relations between said temperatures so as to provide the desired sequential operation of the apparatus as outlined above.

While the principle of the present invention may be employed with advantage in other temperature control service such as with cooling apparatus or other forms of heating systems, the single figure of the accompanying drawing diagrammatically shows the invention embodied in a room air conditioning system for purposes of illustration and explanation of the principle thereof.

As shown in the drawing the air conditioning apparatus 10 is provided with a blower 11 driven by the electric motor 12 for circulating the air from the cold air return duct 15 to the hot air distributing duct 16. A finned air heating coil or radiator 17 and a humidifying device 18 both located in space B inside the air conditioner 10 are provided for conditioning the circulated air.

The electrically controlled oil fired boiler furnace 20 supplies steam to the air heating coil 17 so as to heat the air which is circulated by the blower 11 through the distribution duct 16. The boiler furnace 20 is provided with suitable electric motor driven pumping apparatus 21 for supplying oil together with high pressure atomizing air and low pressure combustion air to the burner head 22 and low pressure combustion air to the lower air box 23. Suitable means including the spark electrodes 24 are provided for igniting the atomized oil to start combustion in the furnace.

Operation of the air conditioning apparatus 10 and the automatic oil fired boiler furnace 20 is selectively controlled by the two thermostats $T_1$ and $T_2$. The thermostat $T_1$ is located in a space or room A to which heated air is supplied through duct 16' from the air distribution conduit 16 as indicated by the dotted lines in the drawing to regulate the temperature of said space.

The room thermostat $T_1$ is shown provided with a suitable bimetallic thermostatic element 27 which operates between two limiting positions R and S in response to variation in the temperature of the space A from a predetermined value. For heating service the position R is the cold position and the position S is the hot position, the mid position in which the element 27 is shown being that corresponding to the desired temperature in the space A which the thermostat $T_1$ is adjusted to maintain.

The thermostat $T_2$ which may be designated as the heat exchange or three position selective thermostat is shown as of the type having the expansible operating bellows 30 connected to the tube 31 which is located in contact with the heating coil 17 so as to be responsive to the variations in the temperature thereof. The bellows 30 operates against the bias of spring 32 to move the contact 33 between three positions indicated as C, I, H which correspond respectively to the cold, the intermediate and the hot temperatures of the heating coil 17.

The improved selective control provided by the present invention enables the thermostats $T_1$ and $T_2$ to effect selective starting and stopping of operation of the air conditioner 10 and the furnace 20 under the following combinations or relations of temperature conditions.

1. With the heat exchange thermostat $T_2$ in either position I or H, indicating that the coil 17 is in condition for effectively heating the circulated air, operation of thermostat $T_1$ to position R will separately start the motor driven blower 11—12.

2. With thermostat $T_2$ remaining in either position I or H, subsequent operation of thermostat $T_1$ to position S will separately stop the operation of the motor driven blower 11—12.

3. With thermostat $T_2$ in position C indicating lack of sufficient heat in the coil 17 to effectively heat the circulated air, operation of the room thermostat $T_1$ to position R will effect the separate starting of the furnace 20 to supply the required heat to the coil 17.

4. With operation of the furnace 20 once started in accordance with condition 3, as soon as the temperature of the coil 17 is raised to the value to effect operation of the thermostat $T_2$ to position I, the operation of the motor blower 11—12 of the air conditioner 10 is then started. Under this condition the operation of furnace 20 is continued jointly with operation of the air conditioner 10.

5. Under the joint operating condition 4, when the operation of the furnace 20 has supplied sufficient heat to the coil 17 to effect operation of thermostat $T_2$ into position H, the operation of the furnace 20 is separately stopped while the operation of the motor blower 11—12 is continued.

6. If during joint operation of the air conditioner and the furnace under condition 4, the supply of heated air to space A becomes sufficient to cause operation of thermostat $T_1$ from position R into position S, the operation of the motor driven blower 11—12 of the air conditioner 10 is separately stopped while the operation of the furnace 20 is continued.

7. In case during joint operation of the air conditioner 10 and the furnace 20 under condition 4, the temperature of the heating coil 17 should decrease so as to cause operation of thermostat $T_2$ from position I to position C, the operation of the air conditioner 10 is separately stopped while the operation of the furnace 20 is continued.

8. Under condition I, in case the separate operation of the air conditioner 10 should reduce the temperature of the air heating coil 17 sufficiently to effect operation of thermostat $T_2$ into position C, then further operation of the motor driven blower 11—12 of the air conditioner 10 is separately stopped and operation of the furnace 20 is separately started.

As will be pointed out more specifically hereinafter the air humidifying apparatus 18 is arranged to be operated under the control of a device $H_c$ which is responsive to the humidity of the air in the space A only when the motor driven fan 11, 12 of the air conditioner 10 is in operation.

The preferred form of selective control apparatus illustrated in the drawing which is operated by the two thermostats $T_1$, $T_2$ under the different combinations of temperature conditions outlined above is constructed and arranged as follows. An electromagnetic switch 40 is provided with a contact 41 for closing and opening a circuit for energizing the motor 12 of the air conditioner from the electric power supply line $L_1$, $L_2$. Another electromagnetic switch 45 is provided with the movable contact 46 for closing a circuit to energize the electrical operating mechanism 21 of the furnace 20 from the supply lines $L_1$, $L_2$. A third thermostat $T_3$ has the expansible bellows 48 arranged to operate the movable contact 46 of electromagnetic switch 45 independently of the energization of electromagnetic switch 45. The bulb 49 of the thermostat $T_3$ is responsive to the temperature of the water in the boiler furnace 20. The thermostat $T_3$ serves to operate the contact 46 to automatically start and stop operation of the burner mechanism 21 so as always to maintain the water in the boiler furnace 20 above a predetermined minimum value. This value is only slightly below the steaming temperature so that the water temperature may be quickly raised to supply steam to the air heating coil 17 whenever the electromagnetic switch 45 is energized. A transfer relay 50 is provided for cooperating with the thermostat $T_1$ and $T_2$ in the selective control of the energization of the electromagnetic switches 40 and 45 to start and stop operation of the air conditioner 10 and the furnace 20. A transformer 60 serves to provide a low voltage source of energizing current for the electromagnetic switch 40 and the relay 50. A separate transformer 62 serves to provide a low voltage source of current for energizing the electromagnetic switch 45. An electric motor driven clock mechanism C is continuously energized from terminals Y and R, of transformer 62 and is arranged to shift the calibration setting of thermostat $T_1$ between the day and the night range in any well known manner.

The detailed operation of the apparatus under the several conditions previously outlined is as follows. Under condition I, as long as the temperature of the air heating coil 17 is sufficiently high so that the contact 33 of selective thermostat $T_2$ is in either position I or H, movement of contact 27 of room thermostat $T_1$ into position R starts separate operation of the air conditioning apparatus 10 in the following manner. A circuit is established from the terminal R of the low voltage secondary winding of the transformer 60 through conductors 70, 71 contacts R and 27 of thermostat $T_1$ conductor 72, contact 51 of the transfer relay 50 in its lower position, conductor 73, the operating winding of relay 40 and thence through conductor 74 to terminal B of transformer 60. The energization of the operating winding of switch 40 serves to operate contact 41 from the open position to which it is biased as shown to close the energizing circuit for the motor 12. This starts operation of the air circulating blower 11. At the same time the auxiliary contact 43 closes to establish a holding circuit for maintaining the operating winding of switch 40 energized from the terminals B and R of transformer 60 which is independent of the original energizing circuit through the thermostat T₁ but extends through contact 51 of transfer relay 50.

The operation of the blower 11 by the motor 12 serves to draw air through the return duct 15 which may be connected with the space A and circulates the air over the finned air heating coil 17 and through the distributing duct 16 and the duct 16' indicated by the dotted lines connected to space A. This serves to transfer heat from the space B to the space A to regulate the temperature of the space A.

At any time during operation of the motor driven blower 11—12 of the air conditioner 10, in case the humidity of the air in the space A is such that the contacts of the humidity responsive device Hc are closed, thereupon an energizing circuit for the electromagnetic water supply valve V is completed in order to supply water to the humidifying device 18. This imparts humidity to the air, in space B. The valve energizing circuit extends from the terminal h of transformer 60 through the contacts of the humidity responsive device Hc, conductor 80, and thence through valve V to conductor 73 which is always connected during operation of the fan to the terminal R of transformer 60. The winding R—h of the transformer provides a higher voltage suitable for operating the valve V.

Operation under condition 2 occurs when the transfer of heat from the coil 17 into space A becomes sufficient to raise the temperature of the space A to effect operation of the contact 27 of thermostat T₁ to position S without reducing the temperature of the coil 17 in space B to the value at which the contacts of selective thermostat T₂ moves out of positions I and H. When contact 27 of thermostat T₁ reaches position S, a short circuit around the operating winding of the electromagnetic switch 40 is established. The short circuit extends from conductor 74 through the upper contact 52 of the relay 50, conductor 81, contact 27 of thermostat T₁ in position S and thence through conductor 72, contact 51, and conductor 73 to the other side of the operating winding of switch 40. This results in deenergizing the switch so as to return contacts 41 and 43 to their respective open positions in which they are shown. The opening of contact 41 stops operation of motor 12 and the opening of contacts 43 opens the energizing circuit of valve V to stop the supply of water to the humidifying device 18.

Operation under condition 3 occurs when the temperature of the air heating coil 17 is reduced to the value which causes operation of contact 33 of the selective thermostat T₂ into position C. With contact 33 in position C, an energizing circuit for the transfer relay 50 is established, this circuit extending from the transformer terminal B through conductor 74, the operating winding of the transfer relay 50, contact 33 in position C and conductors 83 and 70 to transformer terminal R. Relay 50 operates to move its contact 51 from the lower position to its upper position and at the same time open the contact 52. The movement of contact 51 to its upper position results in transferring the control of thermostat T₁ from the starting switch 40 of the air conditioning apparatus to the starting switch 45 of the furnace 20. Thus with thermostat T₁ in position R and contact 51 of transfer relay 50 in its upper position, an energizing circuit for the operating winding of starting switch 45 is completed from the terminal R₁ of transformer 62 through conductors 70 and 71, contact 27 in position R, conductor 72, contact 51 in its upper position, conductors 85 and 86, the operating winding of switch 45 and conductor 87 to terminal B₂ of transformer 62. When thus energized the switch 45 operates the contact 46 to energize the oil burner mechanism 21 of the boiler furnace 20 from the supply lines L₁, L₂ through conductors 88 and 89. This starts operation of the oil burner mechanism to establish combustion in the furnace so as to raise the temperature of the water in the boiler to the steaming point and thereby supply steam to raise the temperature of the air heating coil 17. Upon closure of switch 45, the auxiliary contact 47 thereof establishes a holding circuit directly from the transformer terminal R₁ through conductor 90. This insures that the burner mechanism 21 when once started into operation continues to supply heat to the coil 17 until the temperature thereof is sufficient to operate contact 33 of thermostat T₂ into position H. In position H, the operating winding of switch 45 is short circuited by the contact 33 thereby stopping operation of the burner mechanism as will be outlined under condition 5.

Operation under condition 4 ordinarily will follow operation under condition 3 as just described. As soon as the operation of the burner mechanism 21 under condition 3 has served to raise the temperature of the air heating coil 17 sufficiently to cause operation of contact 33 of thermostat T₂ from position C into position I, then the operating winding of transfer relay 50 will be deenergized. This results in the return of contact 51 to its lower position in accordance with its bias and also the closure of contact 52. Upon the return of contact 51 to its lower position, the energizing circuit for switch 40 which was described under condition 1 is again completed. Thereupon switch 40 operates to energize the motor 12 for driving the air circulating blower 11 and also to start a supply of water to the humidifying apparatus 18 in case the humidistat Hc indicates a deficiency of humidity in the space A. Thus under condition 4 both the furnace and the air conditioner are in operation to supply properly conditioned air in the space A.

Operation under condition 5 occurs whenever during joint operation of furnace 20 and air conditioner 10, as in condition 4, the temperature of the air heating coil 17 is increased sufficiently to cause operation of contact 33 of thermostat T₂ into position H in which the operating winding of switch 45 is short circuited through conductors 86 and 91. This deenergizes the switch 45 and contact 46 is opened to deenergize the burner mechanism 21. At the same time auxiliary contact 47 opens the holding circuit.

Operation under condition 6 will occur when during joint operation of the air conditioner 10 and the furnace 20 under condition 4, the supply of heated air to space A becomes sufficient to cause operation of thermostat T₁ from position R into position S. With contact 27 of thermostat T₁ in position S, a short circuit for the operating winding of switch 40 is established, this circuit extending from one terminal of the operating winding through conductor 73, switch 51 in its lower position, conductor 72, contact 27 in position S, conductor 81 and switch 52 to the other terminal of the operating winding. This deenergizes the switch 40 and contact 41 opens to deenergize motor 12. However, it will be understood that the burner mechanism 21 of furnace 20 will always continue in operation until stopped by operation of contact 33 of thermostat T₂ in position H as described under condition 5.

Operation under condition 7 will occur in case the temperature of the air heating coil 17 decreases sufficiently to operate contact 33 of thermostat T2 into position C during operation of the motor blower 11, 12 of the air conditioner 10 under condition 1. The movement of contact 33 into position C serves to energize the transfer relay 50 so as to operate contact 51 to stop operation of the air conditioner and start operation of the furnace. Under these conditions the movement of contact 51 from its lower position serves to interrupt the holding circuit for the operating winding of switch 40 extending through auxiliary contact 43 and conductors 75 and 76, thereby deenergizing the switch to open contact 41 and deenergize motor 12. The movement of contact 51 into its upper position serves to energize switch 45 and thereby start operation of the burner mechanism 21 in the manner described under condition 3.

Operation under condition 8 occurs in case during operation under condition 1, the separate operation of the motor blower 11, 12 of the air conditioner 10 should reduce the temperature of the air heating coil 17 sufficiently to effect operation of contact 33 of thermostat T2 into position C. This serves to energize the transfer relay 50 so as to stop operation of the air conditioner and start operation of the furnace in the manner described under condition 7. It will be understood, however, that due to the heat storage capacity of the water in boiler furnace 20, the air heating coil 17 will be maintained heated for an appreciable interval of time during separate operation of the motor blower 11, 12 of the air conditioner. Thus in mild weather the air conditioner may be operated repeatedly under the control of the room thermostat T1 without causing the temperature of the air heating coil 17 to decrease below the value at which the selective thermostat T2 operates to start operation of the furnace.

The selective control provided by the present invention insures that the burner mechanism 21 of furnace 20 is operated when once started over a considerable period so as to store an appreciable amount of heat in the boiler water. This heat then may be distributed in small increments by repeated operation of the motor blower 11, 12 of the air conditioner 10 to the room without requiring further operation of the automatic furnace. At the same time the selective control of the present invention effectively prevents the circulation of cold air by the operation of the air conditioner at any time. While the principle of the invention is particularly advantageous in air conditioning systems of the character described above, it will be apparent to those skilled in the art that it may be applied with equal advantage in other temperature regulating service.

What I claim as new and desire to secure by Letters Patent of the United States, is:

1. In a temperature control system, the combination of apparatus operable for circulating a heat transfer medium to regulate a temperature condition, apparatus operable to regulate the temperature of said medium, a thermostatic control element responsive to said temperature condition and having separate start and stop control connections with said circulating apparatus, a control transfer device operable to transfer the start control connection of said thermostatic control element from said circulating apparatus to said temperature varying apparatus, and a second thermostatic control element responsive to the temperature of said medium for controlling operation of said transfer device and having a separate stop control connection with said temperature varying apparatus independent of said transfer device.

2. In a temperature control system, the combination of means operable for transferring heat between two spaces to regulate the temperature of one of said spaces, separate means operable for regulating the temperature of the other space, a thermostatic device responsive to the temperature of said one space and having a start connection provided with a selective device for selectively and separately starting operation of each of said means at a predetermined temperature in said one space and having a separate stop connection for said heat transfer means controlled by said transfer device, and a second thermostatic device responsive to the temperature of said other space for controlling the operation of said selective device and having a separate stop connection for said separate means independent of said transfer device.

3. In a temperature control system, the combination of means operable for transferring heat between two spaces to regulate the temperature of one of said spaces, separately operable means for regulating the temperature of the other space, a thermostatic device responsive to the temperature of said one space and having separate start and stop connections for controlling the operation of said heat transfer means, a second thermostatic device responsive to the temperature of said other space and having a stop connection for controlling the stopping of operation of said second means, and control transfer means operable under the control of said second device for transferring the start connection of said first device to control the starting of said separately operable means and for interrupting the stop connection of said first device.

4. In a temperature control system, the combination of means operable for transferring heat between two spaces to regulate the temperature of one of said spaces between two limiting values, separately operable means for regulating the temperature of the other space through a range having an intermediate value between two limiting values, a thermostatic device responsive to the temperature of said one space for controlling the starting of operation of a selected one of said means when the temperature of said space is at one of said limiting values and the stopping of operation of said first means when the temperature of said space is at said other limiting value, and a second thermostatic device responsive to the temperature of said other space connected to stop operation of said separately operable means when the temperature of said other space reaches the upper limiting value and having a selective two-position relay controlled thereby and interconnected with said first thermostatic device for selectively controlling the starting and stopping of operation of said first means and the starting of operation of said separately operable means in accordance with variations in the temperature of said other space between said intermediate value and the lower limiting value.

5. In a temperature control system, the combination of electrically controlled means operable for varying the temperature of a space, separate electrically controlled means operable for transferring heat between said first space and a second space to regulate the temperature of said second space, a first thermostatic control device operable between two circuit closing positions upon opposite variations in the temperature of said first space, a second thermostatic control device operable between two circuit closing positions upon opposite variations in the temperature of said second space, a circuit selective relay operated from one position to another position upon operation of said first thermostatic control device to a predetermined one of its positions, circuit connections established in said one position of said relay whereby said second control device in one position thereof controls the starting of operation of said second means and in the other position thereof controls the stopping of operation of said second means, circuit connections established in the other position of said relay whereby said second control device controls in said one position thereof the starting of operation of said first means, and circuit connections whereby operation of said first control device to its other position effects stopping of operation of said first means.

6. In a temperature control system, the combination of means for transferring heat between one space and another space, means operable for varying the temperature of said one space, a first thermostat responsive to the temperature of said one space, a second thermostat responsive to the temperature of said other space, means including a selective device operable under the control of said first thermostat upon variations in the temperature of said one space for selectively rendering said second thermostat effective to control the starting of operation of each of said means when the temperature of said other space is at a predetermined value and the stopping of operation of said first means when the temperature of said other space is at a higher value, said device being operable under the control of said first thermostat for stopping operation of said one means independently of said second thermostat, and separate means under the exclusive control of said first thermostat for stopping operation of said other means.

7. In a temperature control system, the combination of means operable for transferring heat between one space and another space, means operable for varying the temperature of said one space, a thermostat responsive to the temperature of said one space, a thermostat responsive to the temperature of said other space, a selective device operable between two positions under the control of said first thermostat and interconnected with said second thermostat for jointly therewith starting separate operation of a corresponding one of said means in each position of said device and stopping operation of only one of said means upon operation of said device from the corresponding position to the other position thereof and thereby insure starting joint operation of said means in a predetermined sequence, and separate means under the exclusive control of said first thermostat for stopping operation of the other means.

8. In a temperature control system, the combination of means operable for transferring heat between one space and another space, means operable for varying the temperature of said one space, a thermostatic control element operable between three control positions in response to variations of the temperature of said one space, a second thermostatic control element operable between two control positions in response to variations of the temperature of said other space, a selective control device operable under the control of said first thermostatic device and interconnected with said second control element for starting separate operation of said first means when said first and second control elements are in predetermined positions, and for starting operation of the other of said means when said second control element is in said predetermined position and said first control element is in a different position and for stopping operation of said one means and starting operation of said other means upon operation of said first control element from said different position to said predetermined position.

9. In a temperature control system, the combination of an automatically controlled device for varying a predetermined temperature condition, said device having energizing means and separate deenergizing means, a second automatically controlled device for varying a second temperature condition in heat transfer relation with said predetermined temperature condition, said second device having energizing means and separate deenergizing means, and control means including a first thermostatic element operable responsively to variations in said predetermined temperature condition between two positions for controlling the energizing means of either one of said automatically controlled devices in one position thereof and the separate deenergizing means of said first electrically controlled device in the other position thereof, and a second thermostatic element operable responsively to variations in said second temperature conditions between two positions and having a selective device controlled thereby for selectively rendering said first element effective for controlling either the energizing and deenergizing means of said first device or the energizing means of said second device and to a third position for controlling the separate deenergizing means of said second device.

10. In a room air conditioning system, the combination of a thermostat responsive to the temperature of a room and movable between a hot and a cold position, an air conditioner having an air heating coil and an electric motor driven blower for circulating air to said room, an automatically fired boiler furnace for supplying heat to said air heating coil, a second thermostat responsive to the temperature of said air heating coil and movable between a hot, an intermediate and a cold position, a two-position circuit selective relay connected to be operated upon operation of said second thermostat between said intermediate and said cold positions and a plurality of separately operable control relays connected with said selective relay and said thermostats and operable selectively to start operation of said furnace with both of said thermostats in their cold position and continue operation of the furnace independently of movement of the room thermostat to its hot position until said second thermostat moves into its hot position, to start operation of said blower with the first thermostat in the cold position and the second thermostat in either the intermediate or hot position, and to stop operation of the blower whenever the first thermostat moves into its hot position or the second thermostat moves into its cold position.

11. In a room air conditioning system, the combination of means operable to circulate the air, means for heating the circulated air including an automatic burner mechanism, and means for selectively controlling the starting of separate operation of the air circulating means and the burner and the starting of joint operation thereof in a predetermined sequence including a room thermostat having only two control positions, a selective thermostat operable between three control positions in accordance with variations in the temperature of the air heating means, a two-position transfer relay controlled by operation of said selective thermostat between two of said control positions and having connections for connecting the room thermostat in one position thereof to control selectively the starting into operation of either the air circulating means or the burner dependent upon the temperature of the air heating means and connections whereby said relay controls the stopping of operation of only said air circulating means and separate connections controlled by said selective thermostat in the third position thereof for stopping operation of said air heating means.

HARRY R. CRAGO.